United States Patent
Kinoshita et al.

(10) Patent No.: US 11,775,497 B2
(45) Date of Patent: Oct. 3, 2023

(54) COMPUTER-READABLE RECORDING MEDIUM STORING INFORMATION PROCESSING PROGRAM FOR GENERATING PARTIAL DATA LINEAGE, METHOD OF GENERATING PARTIAL DATA LINEAGE, AND INFORMATION PROCESSING DEVICE FOR GENERATING PARTIAL DATA LINEAGE

(71) Applicant: FUJITSU LIMITED, Kawasaki (JP)

(72) Inventors: Fuma Kinoshita, Kobe (JP); Yuho Shiinoki, Akashi (JP); Shigeyuki Dambayashi, Kakogawa (JP); Isao Hasegawa, Kobe (JP); Masakazu Kawasaki, Nishinomiya (JP); Kaori Osaka, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 17/568,903

(22) Filed: Jan. 5, 2022

(65) Prior Publication Data
US 2022/0292070 A1 Sep. 15, 2022

(30) Foreign Application Priority Data
Mar. 15, 2021 (JP) .................................. 2021-041009

(51) Int. Cl.
*G06F 16/23* (2019.01)
(52) U.S. Cl.
CPC .................................... *G06F 16/23* (2019.01)
(58) Field of Classification Search
None
See application file for complete search history.

(56) References Cited

U.S. PATENT DOCUMENTS

| | | | |
|---|---|---|---|
| 2013/0297477 A1* | 11/2013 | Overman | G06Q 40/00 705/37 |
| 2017/0154087 A1* | 6/2017 | McClure | G06Q 10/0633 |
| 2018/0157702 A1* | 6/2018 | Clemens | G06F 16/83 |
| 2021/0365456 A1* | 11/2021 | Kondiles | G06F 16/248 |
| 2022/0075692 A1* | 3/2022 | Guha | G06F 40/30 |

FOREIGN PATENT DOCUMENTS

| | | |
|---|---|---|
| JP | 2008-146118 A | 6/2008 |
| JP | 2011-238165 A | 11/2011 |

OTHER PUBLICATIONS

Tanguy, Germain, "Getting Started with Data Lineage", Aug. 9, 2019 Medium.com blog post, 17 pages. (Year: 2019).*

* cited by examiner

*Primary Examiner* — Scott A. Waldron
(74) *Attorney, Agent, or Firm* — Fujitsu Patent Center

(57) ABSTRACT

A non-transitory computer-readable recording medium stores an information processing program for causing a computer to execute processing including: every time a plurality of data to be managed in a data lineage indicating histories of the plurality of data are updated, storing an update date and time in association with updated data; in response to an input of a designated date and time or a designated period, based on the update date and time stored in association with each of the plurality of data, determining data updated within a predetermined period including the designated date and time or within the designated period as data of interest; and generating a partial data lineage that is a part of the data lineage and includes a display object corresponding to the data of interest.

5 Claims, 18 Drawing Sheets

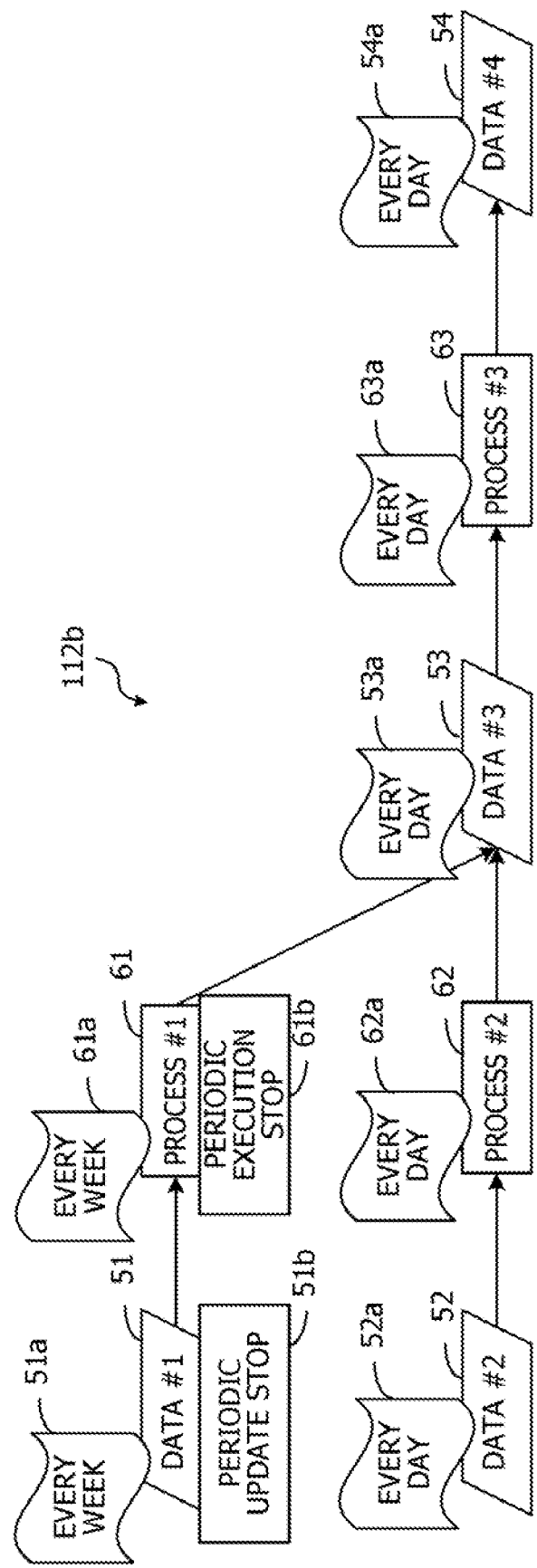

COMPUTER-READABLE RECORDING MEDIUM STORING INFORMATION PROCESSING PROGRAM FOR GENERATING PARTIAL DATA LINEAGE, METHOD OF GENERATING PARTIAL DATA LINEAGE, AND INFORMATION PROCESSING DEVICE FOR GENERATING PARTIAL DATA LINEAGE

CROSS-REFERENCE TO RELATED APPLICATION

This application is based upon and claims the benefit of priority of the prior Japanese Patent Application No. 2021-41009, filed on Mar. 15, 2021, the entire contents of which are incorporated herein by reference.

FIELD

The embodiments discussed herein are related to a computer-readable recording medium storing an information processing program, a method of processing information, and an information processing device.

BACKGROUND

For a data lake, which stores and accumulates various types of data, it is important to appropriately manage and use these data. As a technology for managing data in a data lake, there is a data lineage (data history information) for grasping an influence range of data including confidential information and a flow of the data. The data lineage includes information indicating a relationship between input data, processing processes, and output data. By using the data lineage, it is possible to express a diagram illustrating what kinds of processing processes each data is generated through. By using the data lineage, it is possible to instantly grasp an influence range of incorrect data, and it is also easy to grasp where personal information exists in a system.

Japanese Laid-open Patent Publication Nos. 2011-238165 and 2008-146118 are disclosed as related art.

SUMMARY

According to an aspect of the embodiments, a non-transitory computer-readable recording medium stores an information processing program for causing a computer to execute processing including: every time a plurality of data to be managed in a data lineage indicating histories of the plurality of data are updated, storing an update date and time in association with updated data; in response to an input of a designated date and time or a designated period, based on the update date and time stored in association with each of the plurality of data, determining data updated within a predetermined period including the designated date and time or within the designated period as data of interest; and generating a partial data lineage that is a part of the data lineage and includes a display object corresponding to the data of interest.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram illustrating an example of a data lineage with a periodic execution or update stop label.

DESCRIPTION OF EMBODIMENTS

As a technique for indicating a data history, for example, a computer system that efficiently manages metadata of a derived file has been proposed. A method has also been proposed that quickly restores data to a desired time point when a failure occurs and easily corrects data when unauthorized data is mixed.

During long-term operation of a system in which data management is performed using a data lineage, a large-scale data lineage including old and new data is generated due to an operation change such as addition or deletion of a data source, correction of an existing processing process, or addition of a new processing process. Accordingly, when a problem occurs in any data, in order to investigate a generation source of the data, an influence range of the problem, and the like, a relationship between histories of all accumulated data and processes is checked, and thus, handling of the problem is extended.

According to one aspect, an object of the present disclosure is to improve efficiency of problem handling using a data lineage.

Hereinafter, embodiments will be described with reference to the drawings. The embodiments may be implemented by combining a plurality of the embodiments as long as no inconsistency is caused.

First Embodiment

Figure 1:
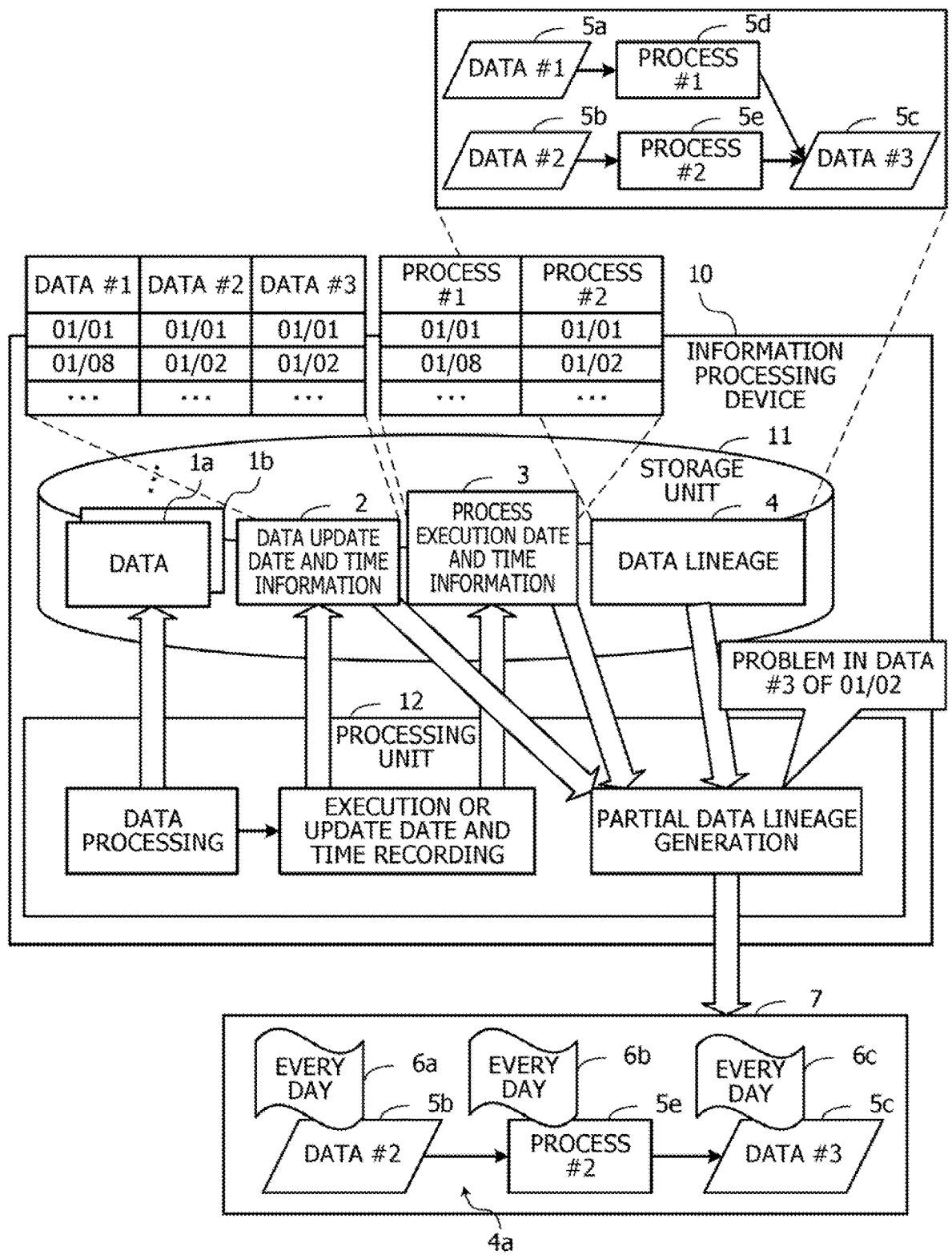
FIG. 1 is a diagram illustrating an example of a method of processing information according to a first embodiment.

FIG. 1 is a diagram illustrating an example of a method of processing information according to a first embodiment. FIG. 1 illustrates an example of a case where an information processing device 10 is used to execute a method of processing information for facilitating investigation of an influence range of a problem using a data lineage. The information processing device 10 may perform the method of processing information according to the first embodiment by executing an information processing program in which a predetermined processing procedure is described, for example.

The information processing device 10 includes a storage unit 11 and a processing unit 12. The storage unit 11 is, for example, a storage device or a memory included in the information processing device 10. The processing unit 12 is, for example, a processor or an arithmetic circuit included in the information processing device 10.

The storage unit 11 stores a plurality of data 1a, 1b, . . . , data update date and time information 2, process execution date and time information 3, and a data lineage 4. The plurality of data 1a, 1b, . . . are data to be subjected to history management using the data lineage 4. The data update date and time information 2 is information indicating an update date and time of each of a plurality of data 1a, 1b, . . . . The process execution date and time information 3 is information indicating an execution date and time when a process that involves update processing of the plurality of data 1a, 1b, . . . is performed. In FIG. 1, the value of the time of each update date and time is omitted.

The data lineage 4 is information indicating a history of the plurality of data 1a, 1b, . . . . The data lineage 4 includes display objects 5a, 5b, and 5c respectively corresponding to the plurality of data 1a, 1b, . . . , for example. The data lineage 4 includes display objects 5d and 5e each corresponding to a process that performs update processing of one of the data. In the data lineage 4, for example, an arrow line is indicated from the display object corresponding to the data of the processing source toward the display object corresponding to the process that performs the processing. In the data lineage 4, for example, an arrow line is indicated from the display object corresponding to the process that performs the processing toward the display object corresponding to the data to which the information of the processing result is added.

The processing unit 12 executes a process prepared in advance to perform processing on the plurality of data 1a, 1b, . . . . The processing executed by one process is, for example, a series of processing including extraction of information, processing and conversion of the extracted information, and addition of the processed and converted information to predetermined data.

Every time one of the plurality of data 1a, 1b, . . . is updated by execution of a process, the processing unit 12 stores an update date and time in association with the updated data. For example, the processing unit 12 adds a value indicating the update date and time to the data update date and time information 2 in association with an identifier of the updated data.

Every time a process is executed, the processing unit 12 stores an execution date and time in association with the executed process. For example, the processing unit 12 adds a value indicating the execution date and time to the process execution date and time information 3 in association with an identifier of the executed process.

Based on the update date and time stored in association with each of the plurality of data 1a, 1b, . . . in response to input of a designated date and time or a designated period, the processing unit 12 determines that data updated within a predetermined period including the designated date and time or within the designated period is data of interest. The predetermined period is, for example, a period before the date and time indicated by the designated date and time (a period from 0 o'clock on the day to the designated date and time).

For example, the date and time when first data having a problem among the plurality of data 1a, 1b, . . . is updated may be input as the designated date and time. In this case, the processing unit 12 determines, as the data of interest, the first data and the second data that is used as an input of the process executed until the first data is generated in the data lineage 4 and has been updated within the predetermined period. The predetermined period in a case where the first data having a problem is indicated may be, for example, a period between an update date and time of the first data indicated by the designated date and time and a first data update date and time immediately before the update date and time. By setting the predetermined period as described above, other data that may affect the update of the first data at the designated date and time may be included in the data of interest without omission.

The processing unit 12 generates a partial data lineage 4a that is part of the data lineage 4 and includes the display object corresponding to the data of interest. The processing unit 12 displays the generated partial data lineage 4a on the display screen 7, for example.

In this way, the partial data lineage 4a may be generated and displayed. The partial data lineage 4a indicates a relationship between data in the influence range of the problem that has occurred. Accordingly, the user is allowed to efficiently deal with the problem using the data lineage 4 by referring to the partial data lineage 4a.

In the example illustrated in FIG. 1, a problem is found in the update result of "01/02" of "data #3". In this case, the user inputs the date and time "01/02" to the information processing device 10 as the designated date and time. Based on the data update date and time information 2, the processing unit 12 specifies "data #2" and "data #3" for which the date and time "01/02" is included in the list of the update date and time. Based on the process execution date and time information 3, the processing unit 12 specifies the "process #2" for which the date and time "01/02" is included in the list of the execution date and time. The processing unit 12 generates the partial data lineage 4a including the display objects 5b, 5c, and 5e respectively corresponding to "data #2", "data #3", and "process #2".

The number of the display objects of the partial data lineage 4a is smaller than that of the data lineage 4, and it is easy to grasp a history of each data. Data and processes related to the problem are clear, and it is easy to investigate the cause of the problem.

The processing unit 12 may determine the update cycle of each of the plurality of data 1a, 1b, . . . based on the update date and time stored in association with each of the plurality of data. In this case, the processing unit 12 attaches cycle display objects 6a to 6c indicating the update cycles of the data of interest to the display objects corresponding to the data of interest in the partial data lineage 4a. By attaching the cycle display objects 6a to 6c, the processing unit 12 allows the user to easily recognize whether or not there is urgency to address the problem.

Based on the update date and time stored in association with the process, the processing unit 12 may determine the execution cycle of the process and attach a cycle display object indicating the execution cycle of the process to the display object corresponding to the process.

In the example illustrated in FIG. 1, the update cycle of "data #1" is one week, and the update cycles of "data #2" and "data #3" are one day. The execution cycle of "process #1" is one week, and the execution cycle of "process #2" is one day. The processing unit 12 attaches the cycle display objects 6a to 6c indicating that the execution or update cycle is "every day" to the display objects 5b, 5c, and 5e respectively corresponding to "data #2", "data #3", and "process #2" in the partial data lineage 4a.

The cycle display objects 6a to 6c are displayed on the display screen 7 together with the partial data lineage 4a. By referring to the cycle display objects 6a to 6c, the user may easily recognize that the problem is to be dealt with within one day.

Based on the latest update date and time stored in association with each of the plurality of data 1a, 1b, . . . , the processing unit 12 may also determine whether or not the next scheduled update date and time according to the update cycle of each of the plurality of data 1a, 1b, . . . have passed. The processing unit 12 determines the update cycle of each of the plurality of data 1a, 1b, . . . based on the update date and time stored in association with each of the plurality of data 1a, 1b, . . . , for example. The processing unit 12 attaches an update stop object indicating that the periodic update has been stopped to the display object corresponding to the third data for which the next scheduled update date and time in the data lineage 4 have passed. In this way, when the current data update status is grasped by referring to the data lineage 4, the data that does not have to be used is clarified, and the efficiency of the cause investigation of the problem using the data lineage 4 is improved.

Second Embodiment

Next, a second embodiment will be described. According to the second embodiment, a history of data managed by a server is displayed in a data lineage.

Figure 2:
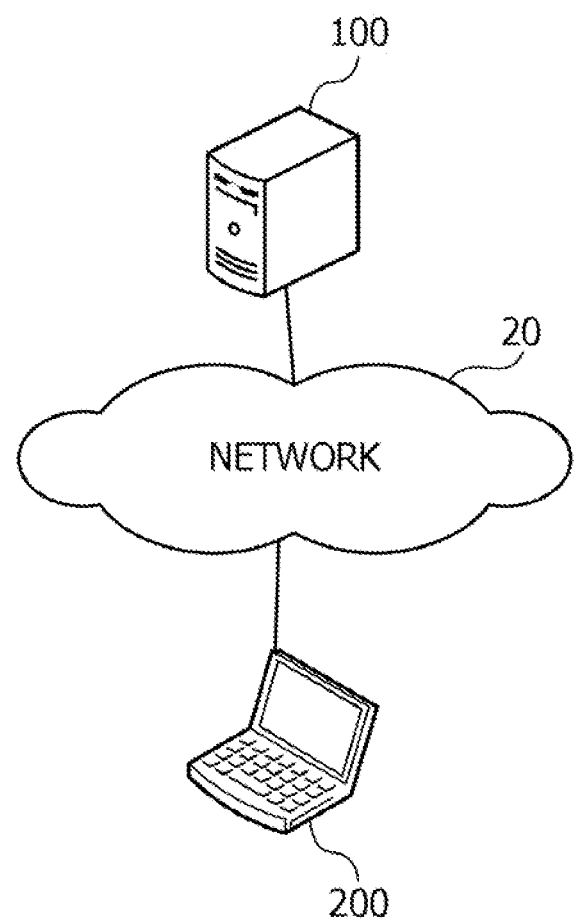
FIG. 2 is a diagram illustrating an example of a system configuration according to a second embodiment.

FIG. 2 is a diagram illustrating an example of a system configuration of the second embodiment. A server 100 and a terminal device 200 are coupled to each other via a network 20. The server 100 is a computer having a database. The server 100 periodically executes conversion and processing processes called extract/transform/load (ETL) to update data, for example. The server 100 manages a history of data by using a data lineage.

The terminal device 200 is a computer used by a user who manages the system. The user displays the data lineage on the terminal device 200 and grasps the history of each data. For example, when a problem is detected in a certain data, the user causes the terminal device 200 to display the data lineage in order to investigate the process or the data that has caused the problem.

Figure 3:
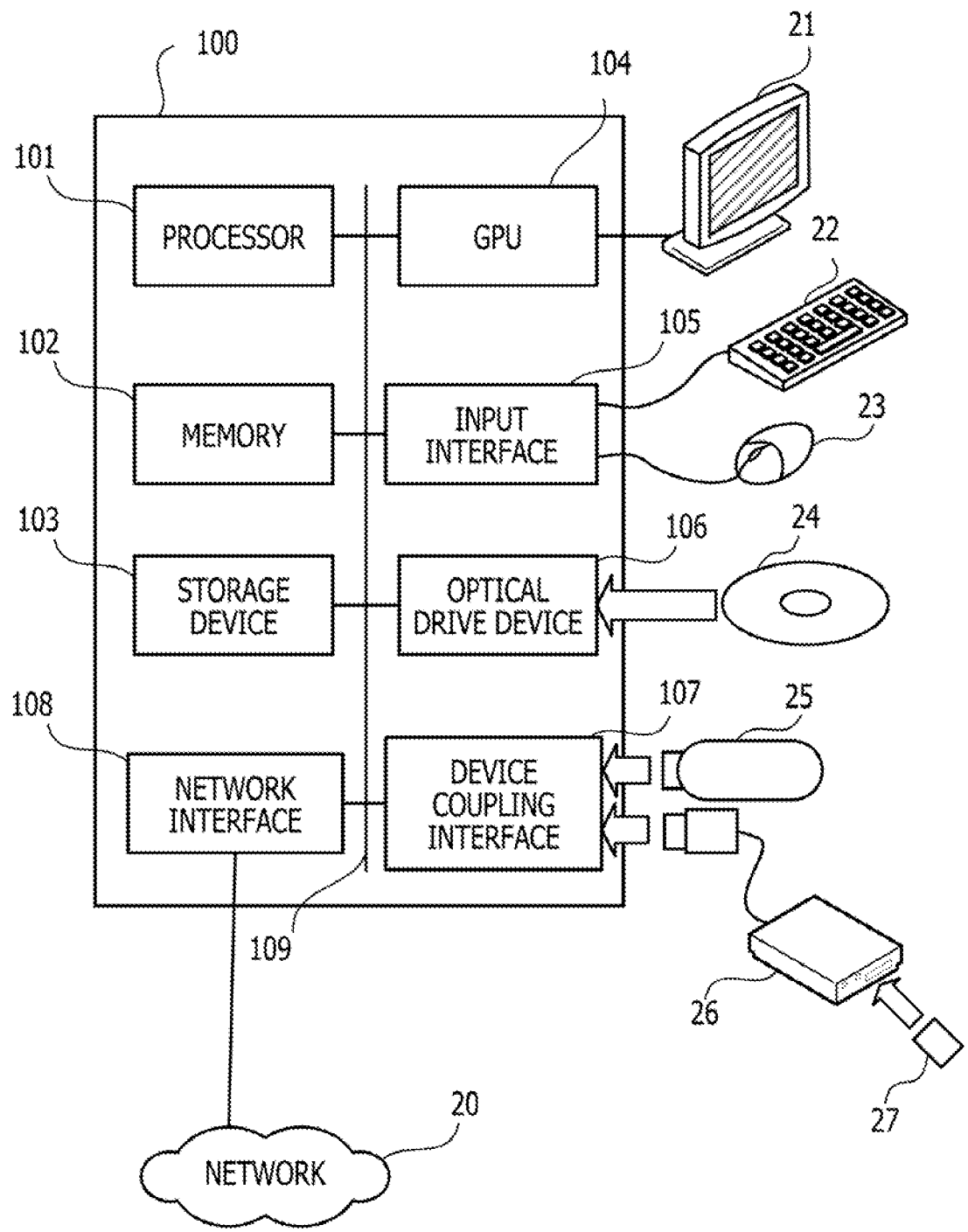
FIG. 3 is a diagram illustrating an example of hardware of a server.

FIG. 3 is a diagram illustrating an example of hardware of the server. The server 100 is entirely controlled by a processor 101. A memory 102 and a plurality of peripheral devices are coupled to the processor 101 via a bus 109. The processor 101 may be a multiprocessor. The processor 101 is, for example, a central processing unit (CPU), a microprocessor unit (MPU), or a digital signal processor (DSP). At least part of functions implemented by the processor 101 executing a program may be implemented by an electronic circuit such as an application-specific integrated circuit (ASIC) or a programmable logic device (PLD).

The memory 102 is used as a main storage device of the server 100. The memory 102 temporarily stores at least part of programs of an operating system (OS) and application programs to be executed by the processor 101. The memory 102 stores various types of data to be used in processing performed by the processor 101. As the memory 102, for example, a volatile semiconductor storage device such as a random-access memory (RAM) is used.

The peripheral devices coupled to the bus 109 include a storage device 103, a graphics processing unit (GPU) 104, an input interface 105, an optical drive device 106, a device coupling interface 107, and a network interface 108.

The storage device 103 electrically or magnetically writes and reads data to and from a recording medium included therein. The storage device 103 is used as an auxiliary storage device of the computer. The storage device 103 stores the program of the OS, the application programs, and the various types of data. As the storage device 103, for example, a hard disk drive (HDD) or a solid-state drive (SSD) may be used.

The GPU 104 is an arithmetic device that performs image processing and is also referred to as a graphic controller. A monitor 21 is coupled to the GPU 104. The GPU 104 displays images on a screen of the monitor 21 in accordance with an instruction from the processor 101. Examples of the monitor 21 include a display device using organic electroluminescence (EL), a liquid crystal display device, and the like.

A keyboard 22 and a mouse 23 are coupled to the input interface 105. The input interface 105 transmits to the processor 101 signals transmitted from the keyboard 22 and the mouse 23. The mouse 23 is an example of a pointing device, and other pointing devices may be used. Examples of the other pointing devices include a touch panel, a tablet, a touch pad, a trackball, and the like.

The optical drive device 106 reads data recorded in an optical disc 24 or writes data to the optical disc 24 by using a laser beam or the like. The optical disc 24 is a portable recording medium in which data is recorded such that the data is readable through reflection of light. Examples of the optical disc 24 include a Digital Versatile Disc (DVD), a DVD-RAM, a compact disc read-only memory (CD-ROM), a CD-recordable (CD-R), a CD-rewritable (CD-RW), and the like.

The device coupling interface 107 is a communication interface for coupling a peripheral device to the server 100. For example, a memory device 25 and a memory reader/writer 26 may be coupled to the device coupling interface 107. The memory device 25 is a recording medium in which the function of communication with the device coupling interface 107 is provided. The memory reader/writer 26 is a device that writes data to a memory card 27 or reads data from the memory card 27. The memory card 27 is a card-type recording medium.

The network interface 108 is coupled to the network 20. The network interface 108 transmits and receives data to and from another computer or a communication device via the network 20. The network interface 108 is, for example, a wired communication interface that is coupled to a wired communication device such as a switch or a router by a cable. The network interface 108 may be a wireless communication interface that is coupled, by radio waves, to and communicates with a wireless communication device such as a base station or an access point.

With the hardware described above, the server 100 may achieve processing functions of the second embodiment. The information processing device 10 described in the first embodiment may also be achieved by the same hardware as the server 100 illustrated in FIG. 3.

The server 100 achieves the processing functions of the second embodiment by executing a program recorded in a computer-readable recording medium, for example. A program in which details of processing to be executed by the server 100 is written may be recorded in various recording media. For example, a program to be executed by the server 100 may be stored in the storage device 103. The processor 101 loads at least part of the program in the storage device 103 to the memory 102 and executes the program. The program to be executed by the server 100 may also be recorded in a portable recording medium such as the optical disc 24, the memory device 25, or the memory card 27. The program stored in the portable recording medium may be executed after the program has been installed in the storage device 103 under the control of the processor 101, for example. The processor 101 may read the program directly from the portable recording medium and execute the program.

Hereinafter, a problem in the investigation of a problem location using the data lineage will be described in detail with reference to FIGS. 4 and 5.

Figure 4:
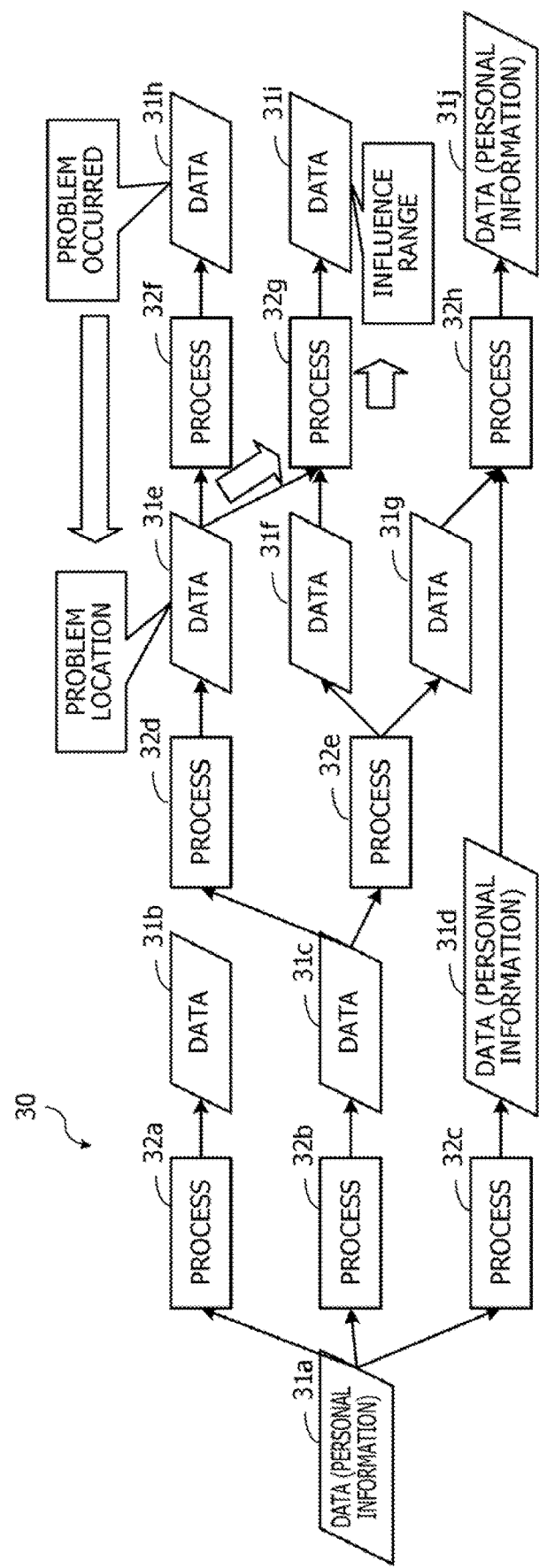
FIG. 4 is a diagram illustrating an example of a data lineage.

FIG. 4 is a diagram illustrating an example of a data lineage. A plurality of entities 31*a* to 31*j* corresponding to data and a plurality of entities 32*a* to 32*h* corresponding to processes are included in a data lineage 30. These entities 31*a* to 31*j* and 32*a* to 32*h* are examples of the display objects 5*a* to 5*e* described in the first embodiment.

The entities are coupled to each other by arrows indicating relationships. When a process reads data, an arrow from the data to be read to the process is set. In a case where a process corrects or processes data read by the process and outputs the data to another data, an arrow from the process to data of the output destination is set.

The data lineage 30 is used to specify an influence range when a problem occurs. For example, it is assumed that a problem has occurred in data corresponding to the entity 31*h*. In this case, the user refers to the data lineage 30, and knows that the data corresponding to the entity 31*h* is generated by processing the data corresponding to the entity 31*e* by the process corresponding to the entity 32*f*. The user investigates the processing content of the process corresponding to the entity 32*f* and investigates the content of the data corresponding to the entity 32*e*.

When there is a cause of the problem in the data corresponding to the entity 31*e*, the user recognizes the presence of a process that has used the data based on the entity 32*g*. The user recognizes that the process has output the data corresponding to the entity 31*i* and that the data may also have been affected by the problem. In this way, the influence range of the problem may be easily specified by using the data lineage 30.

In a case where personal information is included in data, it is possible to easily grasp in which data the personal information is included by referring to the data lineage 30. For example, when it is found that personal information is included in data corresponding to the entity 31*j*, it is possible to easily grasp that personal information is also included in data corresponding to the entities 31*a*, 31*d* used to generate the data by referring to the data lineage 30.

During a long-term operation of a system that performs data management using the data lineage 30, a large number of entities including old and new entities are added to the data lineage 30 due to an operation change such as addition or deletion of a data source, correction of an existing processing process, or addition of a new processing process. Accordingly, when a problem occurs, an enormous number of entities accumulated have to be checked for investigating data that is a generation source of the problem and an influence range of the problem, and an investigation time is lengthened.

For making it possible to search histories of all data by using the data lineage 30, it is important to incorporate all entities including old and new entities into the data lineage 30. On the other hand, when a data having a problem is specified, not all entities in the data lineage 30 are targeted for investigation. For example, there is an entity that does not have to be investigated.

Figure 5:
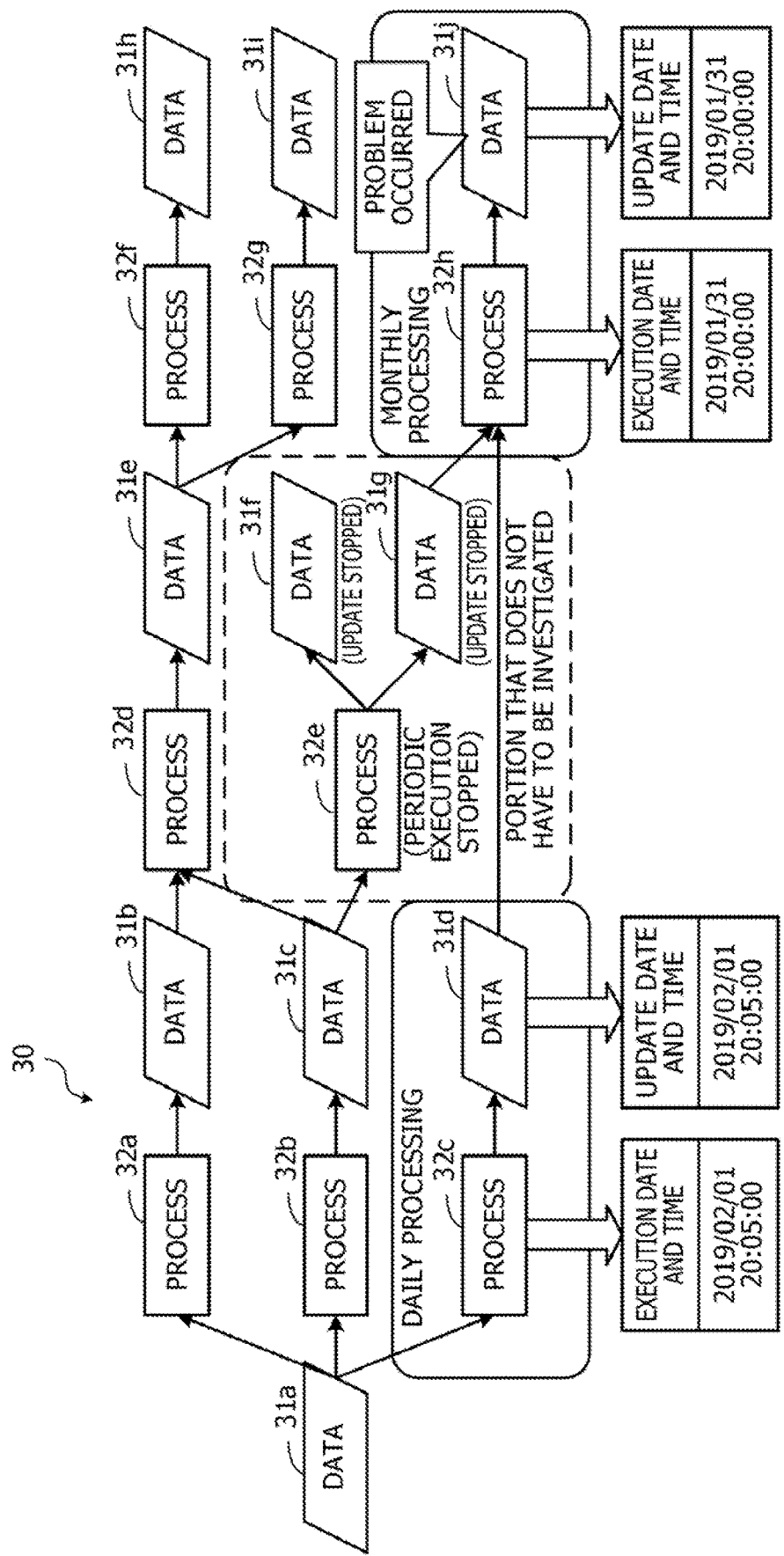
FIG. 5 is a diagram illustrating an example of a data lineage including entities that do not have to be investigated.

FIG. 5 is a diagram illustrating an example of a data lineage including entities that do not have to be investigated. In the data lineage 30 illustrated in FIG. 5, the processing by the process corresponding to the entity 32*c* is executed at 5 o'clock every day, which is daily processing. The processing by the process corresponding to the entity 32*h* is executed at 20 o'clock on the last day of every month, which is monthly processing. On the other hand, periodic execution of processing by the process corresponding to the entity 32*e* has been stopped.

A problem is assumed to have been detected in the data corresponding to the entity 31*j* in the data lineage 30 illustrated in FIG. 5. The latest update date and time of the data is "2019/01/31 20:00:00". In this case, in specifying the cause of the problem, the process and the data for which the periodic execution or the periodic update has been stopped do not have to be investigated.

As described above, the data lineage 30 includes the entities corresponding to the process or the data that does not have to be investigated in the cause identification of the problem. However, in the related-art method, all the entities included in the data lineage 30 are displayed when the data lineage 30 is displayed. For this reason, when a cause location related to data having a problem is specified, all entities corresponding to processes or data that are not periodically executed or periodically updated at the time when the data is processed are also displayed. This causes an increase in the investigation period.

Another problem is that, since the frequency (processing frequency) of updating or executing a target data or process is unknown only by displaying the data lineage 30, it is not possible to determine when to deal with the data by tracking the history of the data. For example, in the example illustrated in FIG. 5, data in which a problem has occurred is data of the monthly processing. For this reason, for example, if there is room until the next processing date, the data do not have to be immediately set as a target of investigation. On the other hand, data having a problem has been generated by processing data corresponding to the entity 31*d*, and the data may have caused the problem. Since the data corresponding to the entity 31*d* is of the daily processing, there is a possibility that the problem becomes large if the countermeasure for the data is procrastinated for many days. For this reason, it is desirable that the handling for the data corresponding to the entity 31*d* is performed as soon as possible.

If the latest execution date and time of each process and the latest update date and time of each data are recorded, it is possible to grasp when data in which a problem has occurred was updated. However, only with the latest update date and time, the execution cycle of each process and the update cycle of each data are not grasped. For this reason, it is impossible to know when the date of the next execution or update is, and it is difficult to determine by when to deal with the process and data within the influence range of the problem.

Accordingly, the server 100 displays only the entities useful for the investigation in the data lineage 30, and displays the execution cycle or the update cycle of each entity. In this way, it is possible to quickly perform the cause investigation of the problem, and it is possible to correctly determine, for each entity, by when to deal with the problem.

Figure 6:
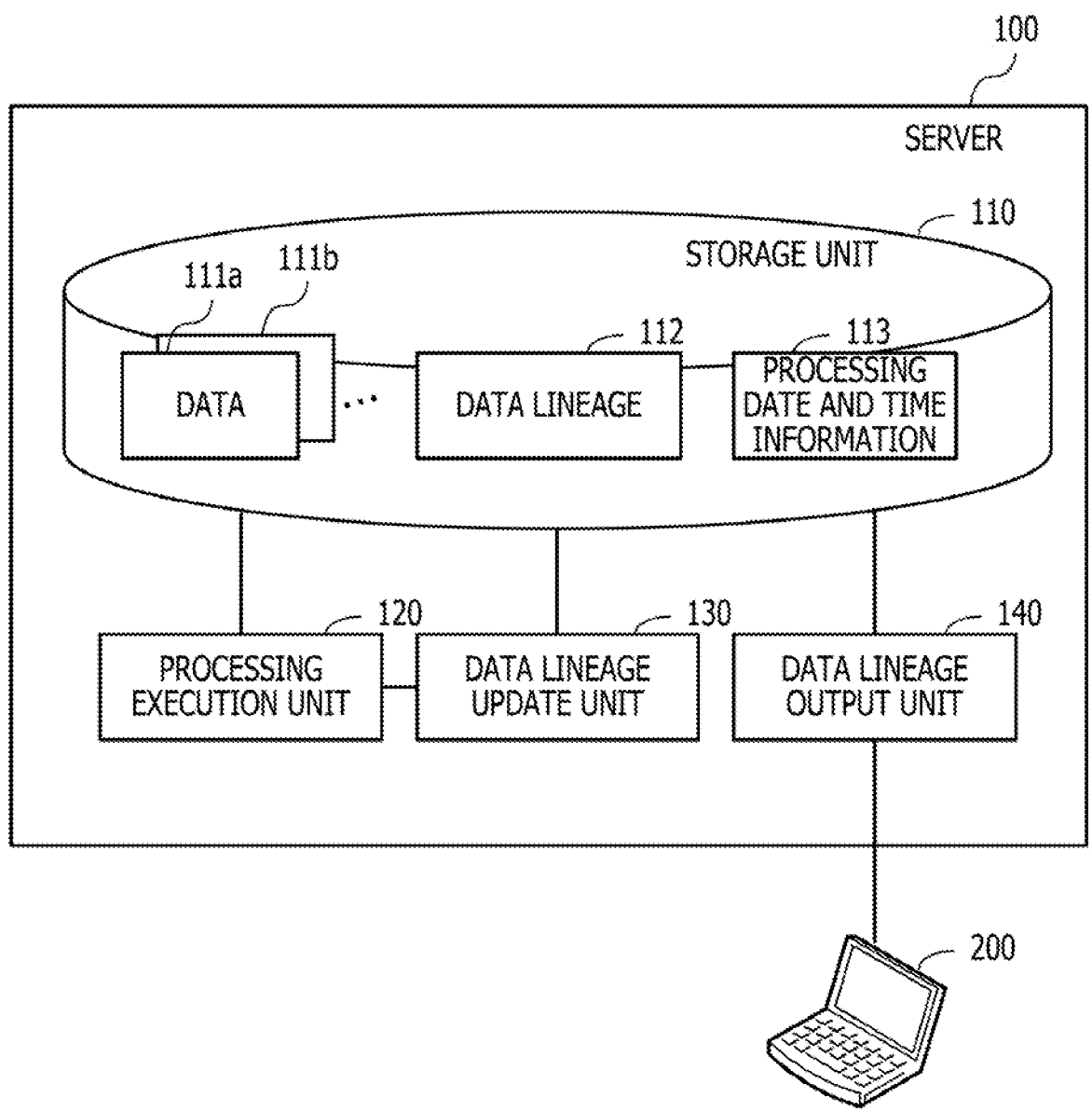
FIG. 6 is a block diagram illustrating an example of functions of a server for data management using a data lineage.

FIG. 6 is a block diagram illustrating an example of functions of the server for data management using the data lineage. A server 100 includes a storage unit 110, a processing execution unit 120, a data lineage update unit 130, and a data lineage output unit 140.

The storage unit 110 stores a plurality of data 1i1a, 111b, . . . , a data lineage 112, and processing date and time information 113. Each of the plurality of data 1i1a, 111b, . . . is data of a target of processing by a process or an output destination of a result of the processing. The data lineage 112 is information indicating a history of the plurality of data 111a, 111b, . . . . The processing date and time information 113 is information on the update dates and times of the plurality of data 1i1a, 111b, . . . and the execution date and time of the process. The storage unit 110 is implemented by, for example, part of a storage region of the memory 102 or the storage device 103 of the server 100.

The processing execution unit 120 executes processes. For example, a process to be periodically executed is defined in the processing execution unit 120. A process is defined by an SQL statement in which, for example, data extraction, conversion or processing, and processing of loading converted or processed data to a predetermined storage destination are described. The execution date and time is set for each process. The processing execution unit 120 executes a process that has reached the execution date and time.

The data lineage update unit 130 monitors the execution of the process by the processing execution unit 120 and the update of the data. The data lineage update unit 130 updates the data lineage 112 based on the execution state of the process and the update state of the data. Every time a process is executed or data is updated, the data lineage update unit 130 records the date and time of the execution or update in the processing date and time information 113. The data lineage update unit 130 calculates the execution cycle of the process or the update cycle of the data based on the processing date and time information 113 and attaches a label indicating the cycle to each entity of the data lineage 112.

The data lineage output unit 140 outputs the data lineage 112 in a display mode corresponding to a request from the terminal device 200. For example, when the data lineage output unit 140 receives, from the terminal device 200, a display request for the data lineage 112 in which data having a problem is specified, the data lineage output unit 140 transmits, to the terminal device 200, part of an entity related to the data having the problem in the data lineage 112.

The functions of each element illustrated in FIG. 6 may be implemented by, for example, causing a computer to execute program modules corresponding to the elements.

Figure 7:
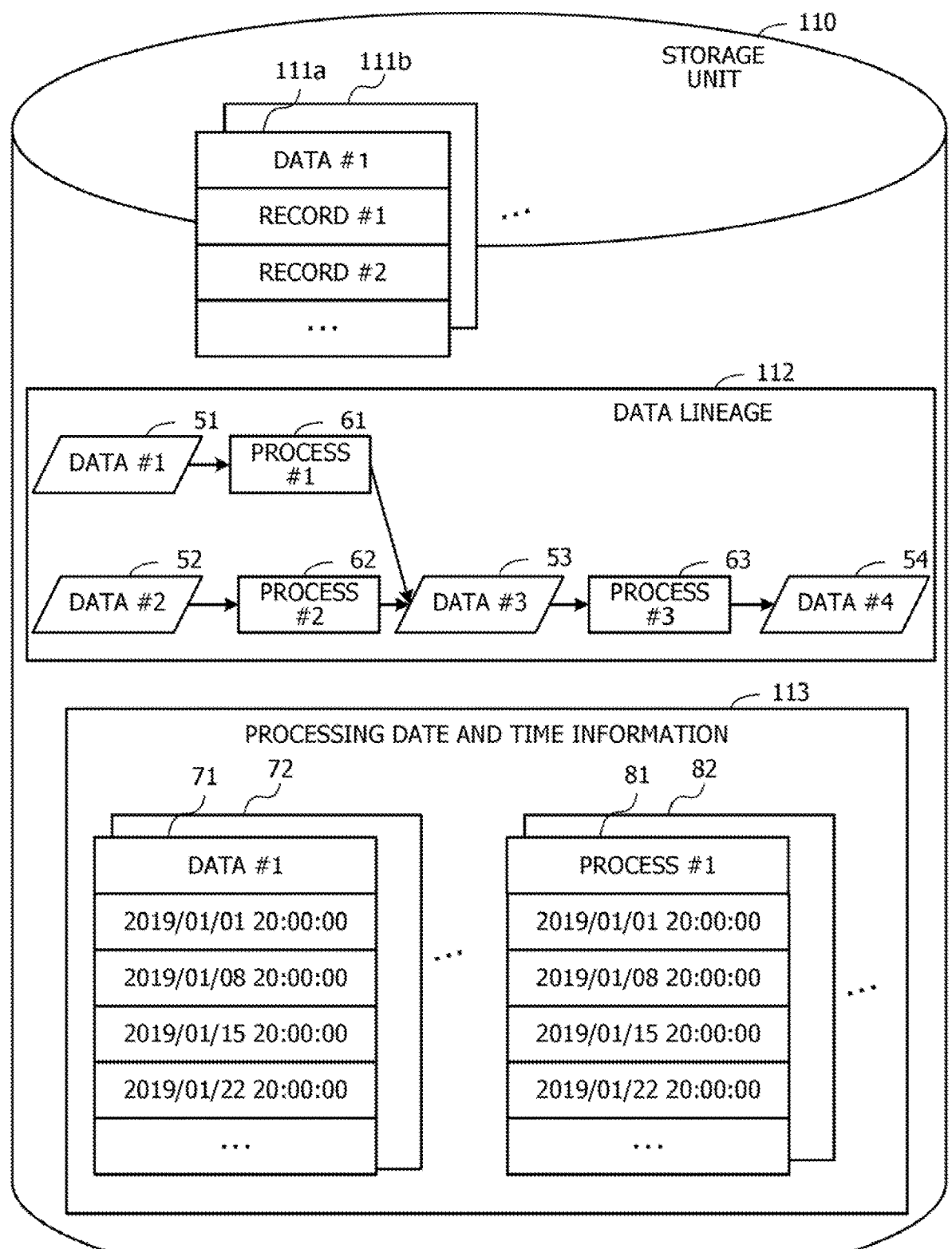
FIG. 7 is a diagram illustrating an example of information stored in a storage unit.

FIG. 7 is a diagram illustrating an example of information stored in the storage unit. Each of the plurality of data 1i1a, 111b, . . . includes one or more records. For example, a plurality of items are provided in each record, and an item value is set for each item. Processing by a process on certain data includes, for example, extraction of a record satisfying a predetermined condition, calculation using an item value in the record, and addition of a record including an item value indicating a calculation result to data of an output destination.

Entities 51 to 54 respectively corresponding to the plurality of data 1i1a, 111b, . . . and entities 61 to 63 corresponding to processes executed by the processing execution unit 120 are included in the data lineage 112.

The processing date and time information 113 includes update date and time lists 71, 72, . . . respectively corresponding to the plurality of data 1/1a, 111b, . . . and execution date and time lists 81, 82, . . . respectively corresponding to the processes executed by the processing execution unit 120. The processing date and time information 113 is updated in accordance with the update processing of the data lineage 112 by the data lineage update unit 130.

The update date and time lists 71, 72, . . . in the processing date and time information 113 are an example of the data update date and time information 2 (see FIG. 1) described in the first embodiment. The execution date and time lists 81, 82, . . . in the processing date and time information 113 are an example of the process execution date and time information 3 (see FIG. 1) described in the first embodiment.

Figure 8:
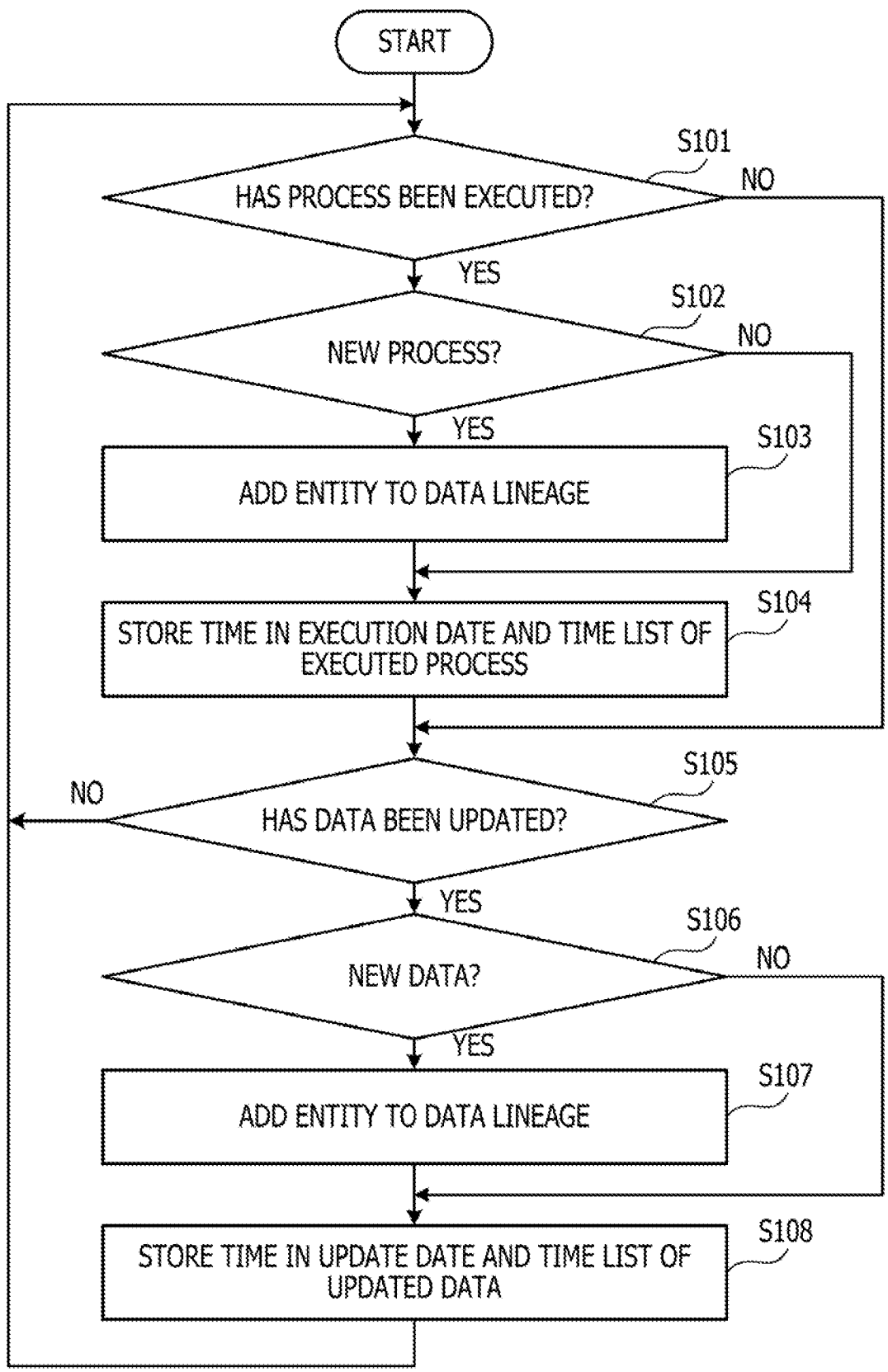
FIG. 8 is a flowchart illustrating an example of a procedure of a data lineage updating process.

FIG. 8 is a flowchart illustrating an example of a procedure of a data lineage updating process. Hereinafter, the processing illustrated in FIG. 8 will be described in accordance with step numbers.

[Step S101] The data lineage update unit 130 determines whether or not a process has been executed by the processing execution unit 120. For example, when the processing execution unit 120 has read one of the data and output a record of a processing result to the data, the data lineage update unit 130 recognizes that the process of the processing using the item value of the record extracted from the read data has been executed. When the process has been executed, the data lineage update unit 130 causes the processing to proceed to step S102. When the process has not been executed, the data lineage update unit 130 causes the processing to proceed to step S105.

[Step S102] The data lineage update unit 130 determines whether or not the executed process is a new process. For example, when a process that data in which an entity corresponding to the data lineage 112 does not exist is set as an output destination has been executed, the data lineage update unit 130 determines that the process is a new process. When a new process has been executed, the data lineage update unit 130 causes the processing to proceed to step S103. When the executed process is an existing process, the data lineage update unit 130 causes the processing to proceed to step S104.

[Step S103] The data lineage update unit 130 adds an entity corresponding to the new process to the data lineage 112.

[Step S104] The data lineage update unit 130 stores the current time in the execution date and time list of the executed process.

[Step S105] The data lineage update unit 130 determines whether or not the data has been updated. For example, the data lineage update unit 130 monitors access to the data in the storage unit 110, and determines that the data has been updated when a record has been added to or deleted from the existing data or new data has been generated. After the data is updated, the data lineage update unit 130 causes the processing to proceed to step S106. When the data has not been updated, the data lineage update unit 130 causes the processing to proceed to step S101.

[Step S106] The data lineage update unit 130 determines whether or not new data has been generated. When new data has been generated, the data lineage update unit 130 causes the processing to proceed to step S107. When new data has not been generated, the data lineage update unit 130 causes the processing to proceed to step S108.

[Step S107] The data lineage update unit 130 adds an entity corresponding to the newly generated data.

[Step S108] The data lineage update unit 130 stores the current time in the update date and time list of the updated data. Then, the data lineage update unit 130 causes the processing to proceed to step S101.

In this way, when the data lineage 112 in which the process has been executed is updated, the time is added to the execution date and time list of the executed process and the time is added to the update date and time list of the updated data.

Figure 9:
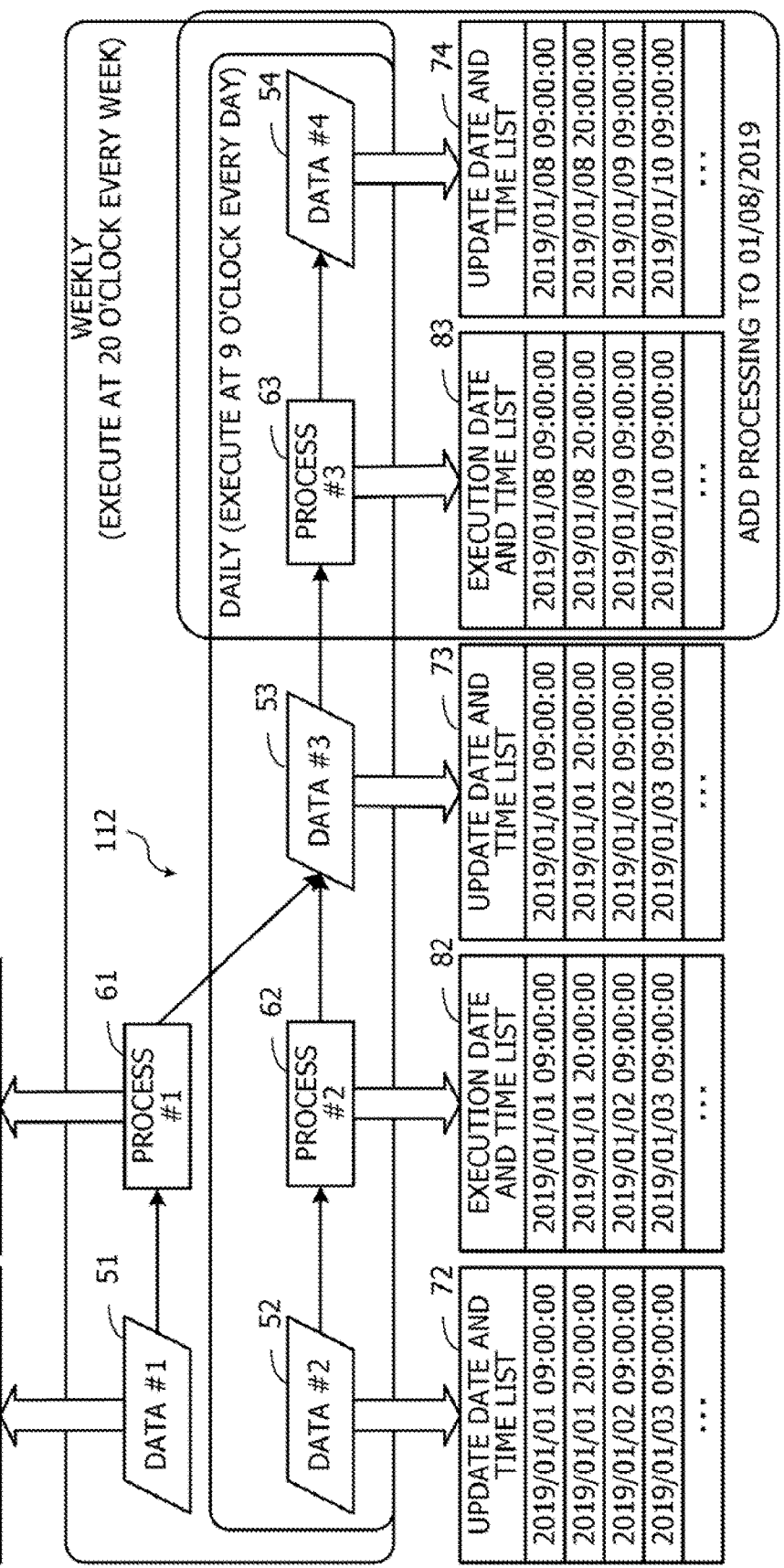
FIG. 9 is a diagram illustrating examples of an update date and time list and an execution date and time list.

FIG. 9 is a diagram illustrating an example of the update date and time lists and the execution date and time lists. In the example illustrated in FIG. 9, "data #1" is updated at 20 o'clock on one day a week. "Data #2", "data #3", and "data #4" are updated at 20 o'clock on one day a week, and are updated at 9 o'clock every day. "Process #1" is executed at 20 o'clock on one day a week. "Process #2" and "process #3" are executed at 20 o'clock on one day a week and are executed at 9 o'clock every day.

Update of all data and execution of all processes indicated in the data lineage 112 are performed on a weekly basis, and update of "data #2", "data #3", and "data #4" and execution of "process #2" and "process #3" are performed on a daily basis.

A date and time when the corresponding data has been updated is set in the update date and time lists 71 to 74 corresponding to the data entities 51 to 54. Similarly, in the execution date and time lists 81 to 83 corresponding to the process entities 61 to 63, the date and time when the corresponding process has been executed is set.

"Process #3" and "data #4" have been added to "2019/01/08". For this reason, the dates and times after "2019/01/01" have been set in the update date and time lists 71 to 73 of "data #1", "data #2", and "data #3", and the dates and times after "2019/01/08" have been set in the update date and time list 74 of "data #4". The dates and times after "2019/01/01" have been set in the execution date and time lists 81 and 82 of "process #1" and "process #2", and the dates and times after "2019/01/08" have been set in the execution date and time list 83 of "process #3".

At a predetermined cycle calculation timing, the data lineage update unit 130 calculates the data update cycle or the process execution cycle based on the update date and time lists 71 to 74 or the execution date and time lists 81 to 83 corresponding to the entities of the data lineage 112. The cycle calculation timing is, for example, a predetermined time every day.

Figure 10:
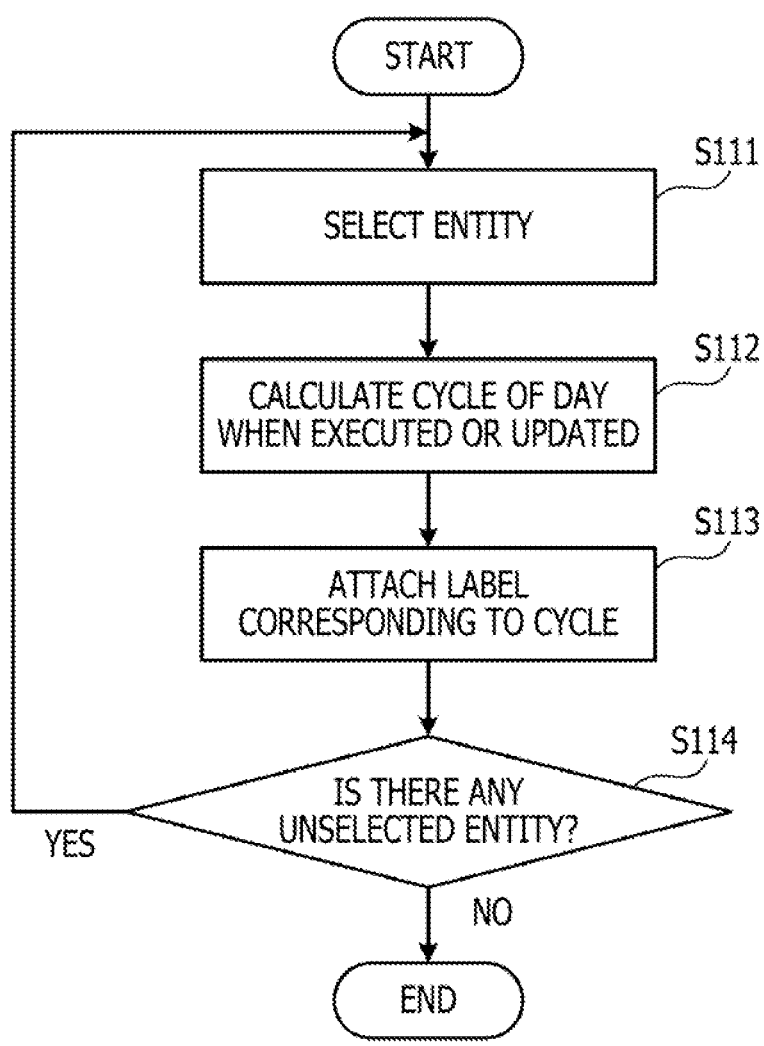
FIG. 10 is a flowchart illustrating an example of a procedure of a cycle calculation process.

FIG. 10 is a flowchart illustrating an example of a procedure of a cycle calculation process. Hereinafter, the processing illustrated in FIG. 10 will be described in accordance with step numbers.

[Step S111] At the cycle calculation timing, the data lineage update unit 130 selects one entity from unselected entities in the data lineage 112.

[Step S112] The data lineage update unit 130 calculates the cycle of the date when the selected entity has been executed or updated. For example, when the selected entity has been executed or updated every day, the data lineage update unit 130 sets the cycle to one day. When the selected entity has been executed or updated on one day in seven days, the data lineage update unit 130 sets the cycle to one week. When there is a day on which the selected entity was executed or updated on one day in each month, the data lineage update unit 130 sets the cycle to one month.

[Step S113] The data lineage update unit 130 attaches a label corresponding to the cycle to the entity.

[Step S114] The data lineage update unit 130 determines whether or not there is an unselected entity. If there is an unselected entity, the data lineage update unit 130 causes the processing to proceed to step S111. After all the entities have been selected, the data lineage update unit 130 ends the cycle calculation process.

In this way, labels each indicating an execution or update cycle are attached to all the entities.

Figure 11:
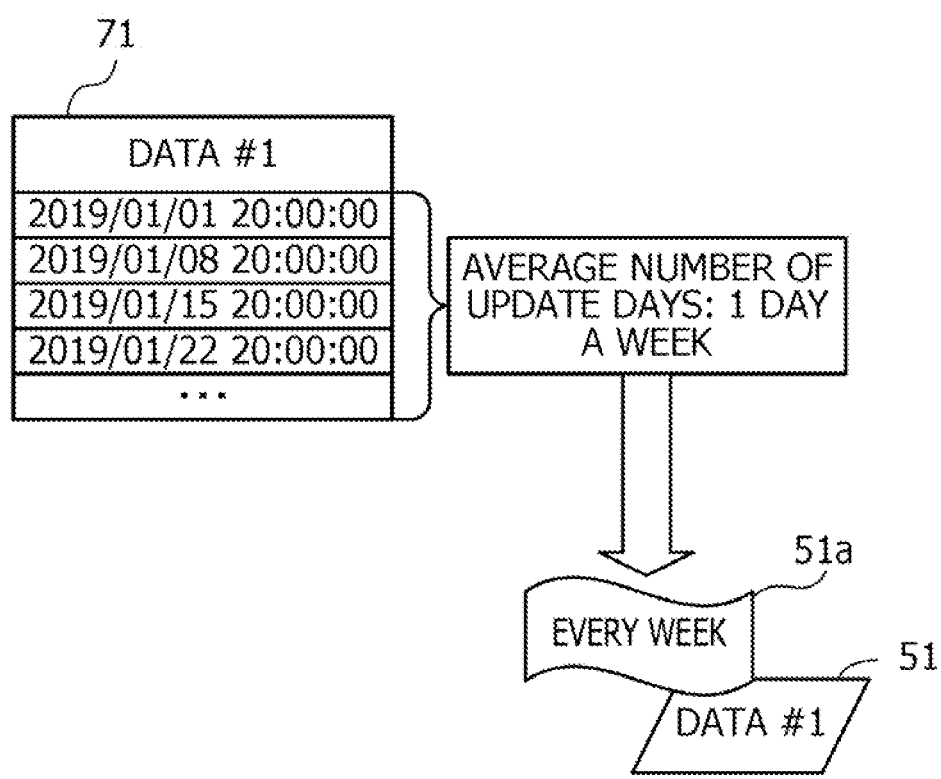
FIG. 11 is a diagram illustrating a first example of the cycle calculation process.

FIG. 11 is a diagram illustrating a first example of the cycle calculation process. The update cycle of "data #1" is calculated in FIG. 11. In the update date and time list 71 of "data #1", the time is registered for one day in seven days. Accordingly, the average number of update days (on a weekly basis) is one day a week. The data lineage update unit 130 attaches a label 51a of "every week" to the entity 51 corresponding to "data #1".

Figure 12:
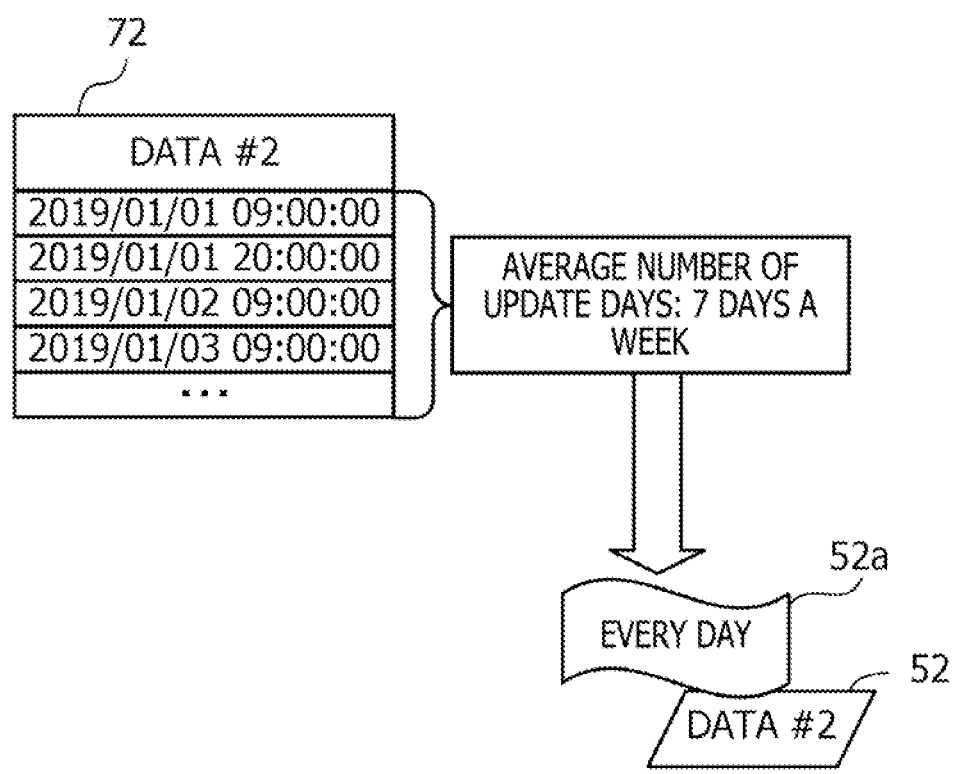
FIG. 12 is a diagram illustrating a second example of the cycle calculation process.

FIG. 12 is a diagram illustrating a second example of the cycle calculation process. The update cycle of "data #2" is calculated in FIG. 12. A time is registered every day in the update date and time list 72 of "data #2". Accordingly, the average number of update days (on a weekly basis) is seven days a week. The data lineage update unit 130 attaches a label 52a of "every day" to the entity 52 corresponding to the "data #2".

Even when a plurality of updates are made on the same day, the day on which the updates are made is counted as one day. For example, although update was made twice in "2019/01/01" in the example of the update date and time list 72, the times of the two updates on the same day are collectively counted as "one day" on which the update was made.

Figure 13:
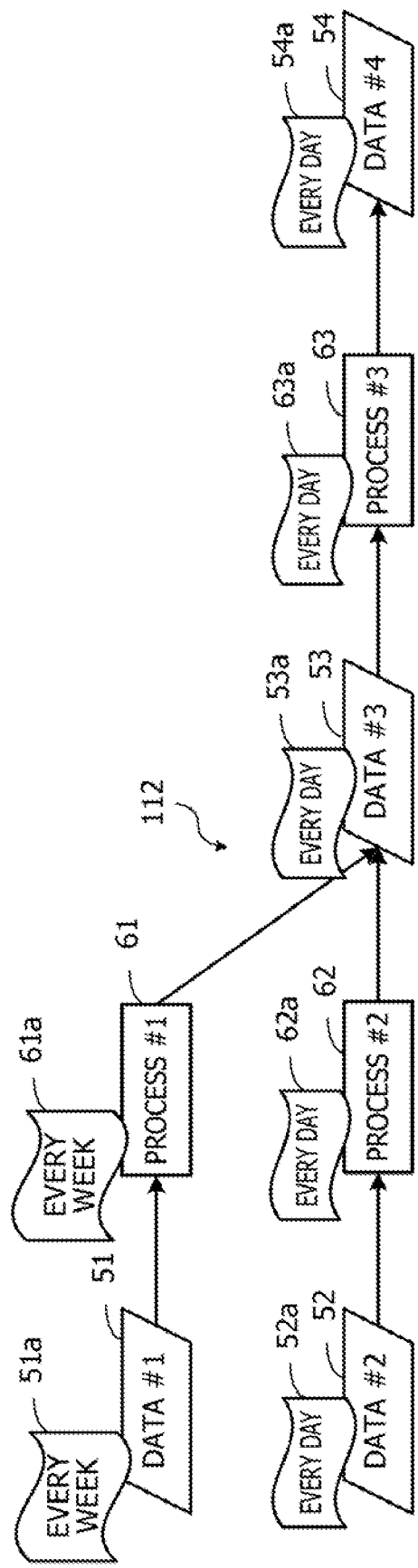
FIG. 13 is a diagram illustrating an example of a data lineage after a label is attached to an entity.

FIG. 13 is a diagram illustrating an example of a data lineage after a label is attached to an entity. In the example illustrated in FIG. 13, labels 51a and 61a of "every week" are attached to the entities 51 and 61. Labels 52a, 53a, 54a, 62a, and 63a of "every day" are attached to the entities 52 to 54, 62 to 63.

When a problem is detected in part of the data 111a, 111b, . . . stored in the storage unit 110, the user designates a data having a problem to the server 100. The data lineage output unit 140 of the server 100 transmits a partial structure of the data lineage 112 to the terminal device 200 by using, as a display target, a portion related to the data having the problem in the data lineage 112. The portion related to the data having the problem in the data lineage 112 is displayed on the terminal device 200.

Figure 14:
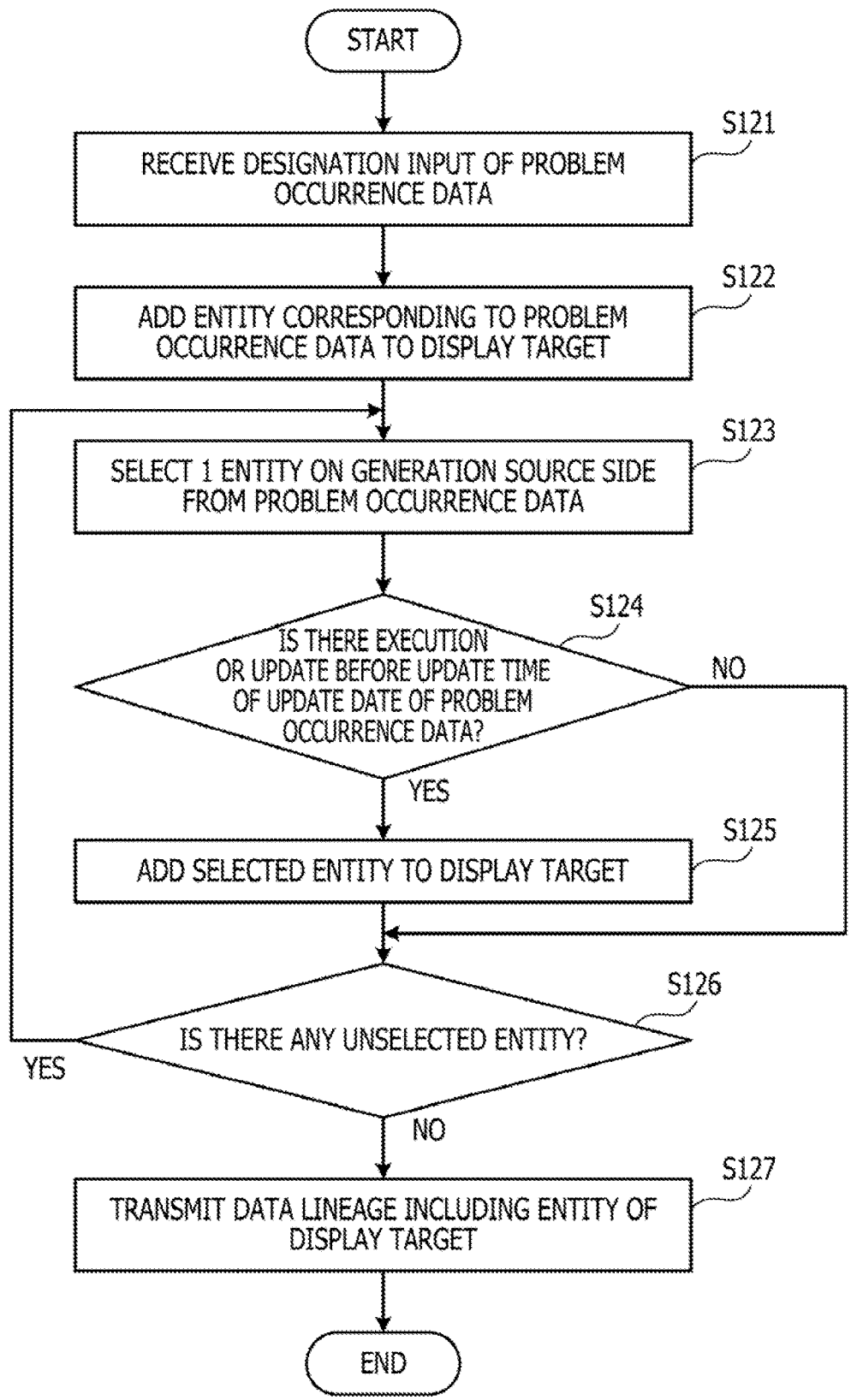
FIG. 14 is a flowchart illustrating an example of a procedure of a data lineage display process related to problem occurrence data.

FIG. 14 is a flowchart illustrating an example of a procedure of a data lineage display process related to problem occurrence data. Hereinafter, the processing illustrated in FIG. 14 will be described in accordance with step numbers.

[Step S121] The data lineage output unit 140 receives designation input of problem occurrence data. For example, an identification number of data having a problem and an update date and time when a portion having a problem (for example, an unauthorized item value) is registered are designated in the designation input of problem occurrence data.

[Step S122] The data lineage output unit 140 adds an entity corresponding to the problem occurrence data to the display target list.

[Step S123] The data lineage output unit 140 selects one of the entities on the generation source side (the left side in the data lineage 122) from the problem occurrence data.

[Step S124] The data lineage output unit 140 refers to the update date and time list in the problem occurrence data, and determines whether or not a process corresponding to the selected entity was executed or whether or not data was updated in a period (predetermined period) before the update time on the same day as the update date of the designated update date and time. The data lineage output unit 140 may set a period from the update date and time of the problem occurrence data immediately before the designated update date and time to the designated update date and time, as the predetermined period for the update existence determination.

When the process was executed or the data was updated in the corresponding period, the data lineage output unit 140 causes the processing to proceed to step S125. When the process was not executed or the data was not updated in the corresponding period, the data lineage output unit 140 causes the processing to proceed to step S126.

[Step S125] The data lineage output unit 140 adds the selected entity to the display target list.

[Step S126] The data lineage output unit 140 determines whether or not there is an unselected entity among the entities on the generation source side from the problem occurrence data. If there is an unselected entity, the data lineage output unit 140 causes the processing to proceed to step S123. When all the entities have been selected, the data lineage output unit 140 causes the processing to proceed to step S127.

[Step S127] The data lineage output unit 140 transmits a data lineage that includes an entity indicated in the display target list and excludes the other entities to the terminal device 200. The data lineage is displayed on the terminal device 200.

In this way, it is possible to display a data lineage that includes only a process related to a data having a problem or an entity corresponding to the data.

The user may designate a date and time or a period instead of designating problem occurrence data. In this case, the data lineage output unit 140 generates a data lineage that includes an entity corresponding to a data updated within a predetermined period based on the designated date and time or within the designated period or a process executed within the period. The predetermined period based on the designated date and time is, for example, a period from 0 o'clock on the same date as that of the designated date and time to the designated date and time.

Figure 15:
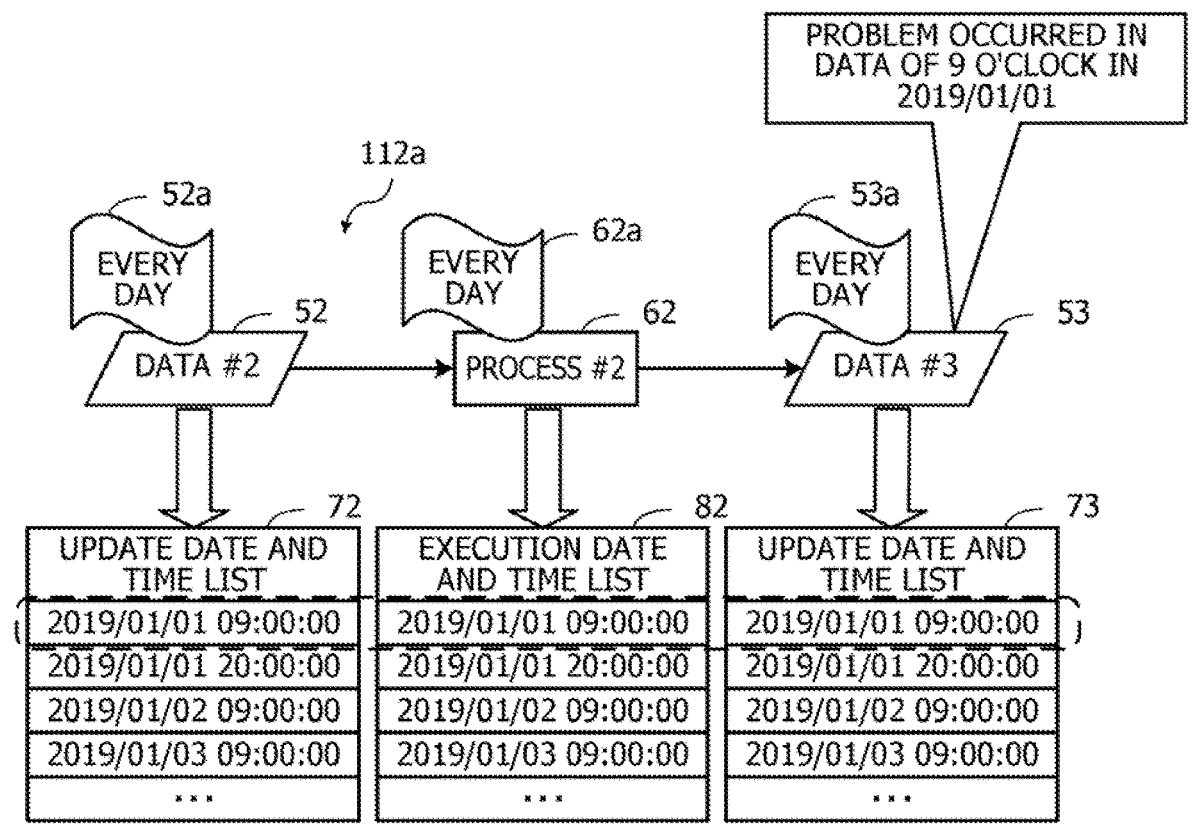
FIG. 15 is a diagram illustrating an example of a data lineage displayed when data having a problem is designated.

FIG. 15 is a diagram illustrating an example of a data lineage displayed when data having a problem is designated. FIG. 15 illustrates an example of a case in which a problem is detected in data updated in "2019/01/01 9:00:00" of "data #3". In this case, the entities corresponding to the data updated within the period from 0 o'clock to 9 o'clock in "2019/01/01" and the processes executed within the period are to be displayed.

In this case, a data lineage 112a that includes the entity 53 corresponding to "data #3", which is the problem occurrence data, the entity 62 corresponding to "process #2", which was executed on the same day, and the entity 52 corresponding to "data #2", which was updated on the same day, is displayed.

By displaying the data lineage 112a including only entities corresponding to data or processes related to a data having a problem in this manner, it is possible to quickly perform work of specifying the cause of the problem and grasp the influence range of the problem. The data lineage 112a illustrated in FIG. 15 is an example of the partial data lineage 4a described in the first embodiment.

Labels 52a, 53a, and 62a each indicating an update cycle or an execution cycle are displayed respectively in association with the displayed entities 52, 53, and 62. The user may appropriately determine the urgency of a target by referring to the labels 52a, 53a, and 62a.

For an entity corresponding to a process for which periodic execution has been stopped or data for which periodic update has been stopped, the data lineage output unit 140 may also display a data lineage while attaching a periodic execution or update stop label to the entity.

Figure 16:
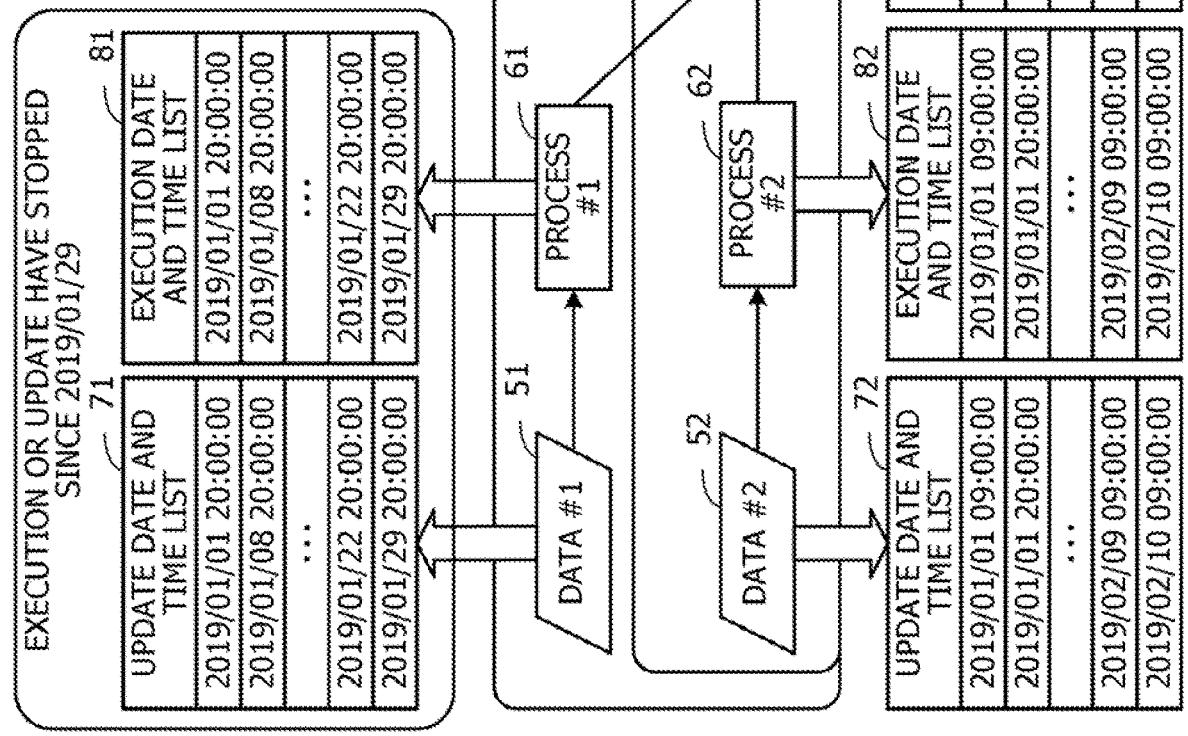
FIG. 16 is a diagram illustrating an example of a data lineage including entities for which periodic execution or update has stopped.

FIG. 16 is a diagram illustrating an example of a data lineage including an entity for which periodic execution or update have been stopped. In the example illustrated in FIG. 16, it is assumed that the current date and time have passed "2019/02/10 09:00:00". An update date and time last set in the update date and time list 71 of "data #1" is "2019/01/29 20:00:00", and an update cycle of the data is weekly. Accordingly, by referring to the update date and time list 71, it is found that the periodic update of "data #1" has stopped since "2019/01/29 20:00:00". Similarly, by referring to the execution date and time list 81 of "process #1", it is found that the periodic update of "process #1" has stopped since the "2019/01/29 20:00:00".

In this way, by referring to the update date and time lists 71 to 74 and the execution date and time lists 81 to 83, the data lineage output unit 140 may determine whether or not the periodic update of the data or the periodic execution of the process corresponding to each entity has stopped. For example, in response to a display request for the data lineage 112, the data lineage output unit 140 may display the data lineage 112 in which a periodic execution or update stop label has been attached to a process or a data for which periodic execution or periodic update has stopped.

Figure 17:
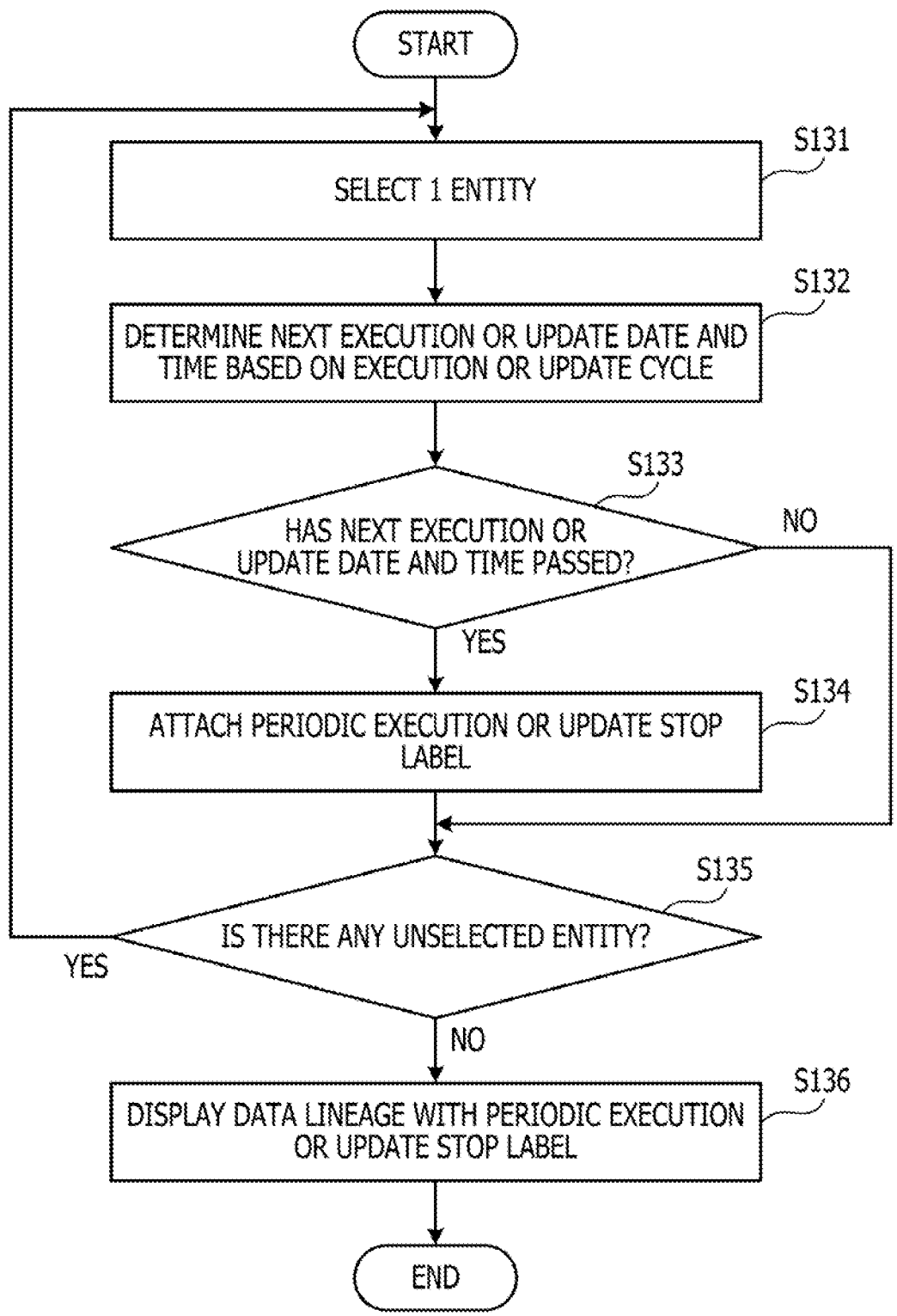
FIG. 17 is a flowchart illustrating an example of a procedure of a display process with a periodic execution or update stop label.

FIG. 17 is a flowchart illustrating an example of a procedure of the display process with the periodic execution or update stop label. Hereinafter, the processing illustrated in FIG. 17 will be described in accordance with step numbers.

[Step S131] The data lineage output unit 140 selects one entity in the data lineage 112.

[Step S132] The data lineage output unit 140 determines the next execution date and time or update date and time based on the execution cycle of the process or the update cycle of the data corresponding to the selected entity.

[Step S133] The data lineage output unit 140 compares the next execution date and time or update date and time with the current date and time, and determines whether or not the next execution date and time or update date and time have passed. When the next execution date and time or update date and time have passed, the data lineage output unit 140 causes the processing to proceed to step S134. When the next execution date and time or update date and time have not passed, the data lineage output unit 140 causes the processing to proceed to step S135.

[Step S134] The data lineage output unit 140 attaches a periodic execution or update stop label to the selected entity.

[Step S135] The data lineage output unit 140 determines whether or not there is an unselected entity. When there is an unselected entity, the data lineage output unit 140 causes the processing to proceed to step S131. When all the entities have been selected, the data lineage output unit 140 causes the processing to proceed to step S136.

[Step S136] The data lineage output unit 140 transmits the data lineage 112 with the periodic execution or update stop label to the terminal device 200, and causes the terminal device 200 to display the data lineage 112.

FIG. 18 is a diagram illustrating an example of a data lineage with a periodic execution or update stop label. For example, it is assumed that the periodic update of "data #1" and the periodic execution of "process #1" have been stopped. In this case, in the data lineage 112b displayed on the terminal device 200, the entity 51 corresponding to "data #1" is displayed with a periodic execution or update stop label 51b indicating the periodic update stop. The entity 61 corresponding to "process #1" is displayed with a periodic execution or update stop label 61b indicating the periodic execution stop.

In this way, the data lineage 112b is displayed with the periodic execution or update stop labels 51b and 61b. Accordingly, for example, when the user checks the history of an item value most recently registered in certain data, the user does not have to consider the influence of a process or data for which periodic execution or periodic update has been stopped before the registration of the item value. As a result, the load of data management is reduced.

While the embodiments have been exemplified above, the configuration of each unit described in the embodiments may be replaced with another configuration having similar functions. Any other components or processes may be added. Two or more of the arbitrary configurations (characteristics) according to the above-described embodiments may be combined with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:
   every time a plurality of data to be managed in a data lineage indicating histories of the plurality of data are updated, storing an update date and time in association with updated data;
   in response to an input of a designated date and time or a designated period, based on the update date and time stored in association with each of the plurality of data, determining data updated within a predetermined period including the designated date and time or within the designated period as data of interest; and
   generating a partial data lineage that is a part of the data lineage and includes a display object corresponding to the data of interest,
   wherein in the determining of the data of interest, in a case where a date and time when first data having a problem among the plurality of data is updated is input as the designated date and time, determining the first data and second data that is used as an input of a process executed until the first data is generated in the data lineage and that is updated within the predetermined period as the data of interest.

2. The non-transitory computer-readable recording medium according to claim 1, wherein the information processing program causes the computer to further execute processing comprising:
   determining an update cycle of each of the plurality of data based on the update date and time stored in association with each of the plurality of data; and
   attaching a cycle display object indicating an update cycle of the data of interest to a display object corresponding to the data of interest in the partial data lineage.

3. The non-transitory computer-readable recording medium according to claim 1, wherein the information processing program causes the computer to further execute processing comprising:
   determining an update cycle of each of the plurality of data based on the update date and time stored in association with each of the plurality of data;
   based on a latest update date and time stored in association with each of the plurality of data, determining whether or not a next scheduled update date and time according to an update cycle of each of the plurality of data have passed; and
   attaching an update stop object indicating that periodic update has been stopped to a display object corresponding to third data for which the next scheduled update date and time in the data lineage have passed.

4. An information processing method comprising:
   every time a plurality of data to be managed in a data lineage indicating histories of the plurality of data are updated, storing, by a computer, an update date and time in association with updated data;
   in response to an input of a designated date and time or a designated period, based on the update date and time stored in association with each of the plurality of data, determining data updated within a predetermined period including the designated date and time or within the designated period as data of interest; and
   generating a partial data lineage that is a part of the data lineage and includes a display object corresponding to the data of interest,
   wherein in the determining of the data of interest, in a case where a date and time when first data having a problem among the plurality of data is updated is input as the designated date and time, determining the first data and second data that is used as an input of a process executed until the first data is generated in the data lineage and that is updated within the predetermined period as the data of interest.

5. An information processing device comprising:
   a memory; and
   a processor coupled to the memory and configured to:
   every time a plurality of data to be managed in a data lineage indicating histories of the plurality of data are updated, store an update date and time in association with updated data;
   in response to an input of a designated date and time or a designated period, based on the update date and time stored in association with each of the plurality of data, determine data updated within a predetermined period including the designated date and time or within the designated period as data of interest; and
   generate a partial data lineage that is a part of the data lineage and includes a display object corresponding to the data of interest,
   wherein in a determination of the data of interest, in a case where a date and time when first data having a problem among the plurality of data is updated is input as the designated date and time, the processor determines the first data and second data that is used as an input of a process executed until the first data is generated in the data lineage and that is updated within the predetermined period as the data of interest.

* * * * *